(12) United States Patent
Haynes et al.

(10) Patent No.: US 11,010,788 B1
(45) Date of Patent: May 18, 2021

(54) METHOD AND SYSTEM FOR PARAMETRIC SURVIVAL ANALYSIS BASED MULTI-TOUCH ATTRIBUTION IN ADVERTISING

(71) Applicant: STARCOM MEDIAVEST GROUP, INC., Chicago, IL (US)

(72) Inventors: Jonathan Frank Haynes, Kenilworth, IL (US); Paul Evan Charpentier, Lake Zurich, IL (US); Kevin George Francart, Long Grove, IL (US); Christopher Michael Strong, Winfield, IL (US); Philippe Vincent Geyskens, Chicago, IL (US)

(73) Assignee: STARCOM MEDIAVEST GROUP, INC., Chicago, IL (US)

( * ) Notice: Subject to any disclaimer, the term of this patent is extended or adjusted under 35 U.S.C. 154(b) by 97 days.

(21) Appl. No.: 16/172,388

(22) Filed: Oct. 26, 2018

Related U.S. Application Data

(63) Continuation of application No. 15/097,969, filed on Apr. 13, 2016, now abandoned.

(60) Provisional application No. 62/149,454, filed on Apr. 17, 2015.

(51) Int. Cl.
*G06Q 30/02* (2012.01)

(52) U.S. Cl.
CPC ..... *G06Q 30/0246* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 9,922,340 B1 * | 3/2018 | Vaver | G06Q 30/0242 |
| 2005/0189415 A1 * | 9/2005 | Fano | G06Q 30/0251 235/383 |
| 2013/0332264 A1 * | 12/2013 | Chittilappilly | G06Q 30/02 705/14.45 |
| 2014/0236710 A1 * | 8/2014 | Nashed | G06Q 30/0246 705/14.45 |
| 2016/0267523 A1 * | 9/2016 | Biswas | H04L 67/02 |

OTHER PUBLICATIONS

Mei-Cheng Wang, "Summary Notes for Survival Analysis", Spring 2006, Department of Biostatistics John Hopkins University, pp. 1-56 (Year: 2006).*

* cited by examiner

*Primary Examiner* — John Van Bramer
(74) *Attorney, Agent, or Firm* — Baker & McKenzie

(57) ABSTRACT

Within the field of advertising, multi-touch attribution (MTA) is the process of assigning credit at a unique identifier level to marketing activities for their contribution towards driving a desired marketing result. This invention discloses a data-driven attribution solution and optimization process for improving marketing return on investment by enabling greater speed and agility in responding to continually changing media performance. Specifically, this invention details a survival analysis based approach to attribution using parametric accelerated failure time (AFT) modeling which accommodates both the right-censored discrete time events and is well suited for media data.

12 Claims, 6 Drawing Sheets

METHOD AND SYSTEM FOR PARAMETRIC SURVIVAL ANALYSIS BASED MULTI-TOUCH ATTRIBUTION IN ADVERTISING

CROSS-REFERENCE TO RELATED APPLICATIONS

This Continuation Application claims priority to US parent patent application Ser. No. 15/097,969, which was filed on Apr. 13, 2016, which is incorporated herein by reference.

FIELD OF THE INVENTION

This invention relates generally to techniques for measuring media effectiveness in advertising. More particularly, it relates to data-driven multi-touch attribution models used with event data at the individual identifier level. For example, for a consumer who ultimately exhibits a desired action, e.g., a product purchase, adding an item to an online cart, using a store locator, submitting an inquiry for more information, or another type of "conversion" event, it relates to methods for assigning credit to media events in a sequence of events preceding the desired action.

BACKGROUND OF THE INVENTION

Statistically driven multi-touch attribution models make it possible to understand how all media channels work together, so that it is possible to correctly attribute and strategically amplify the impact of all brand interactions, and then tactically optimize investments based on that knowledge to drive greater marketing return on investment. This invention discloses a specific approach to attribution modeling and assigning fractional credit for conversion events across media channels as well as a constrained optimization approach for acting optimally based on the fractional credits produced by the model.

BRIEF DESCRIPTION OF THE INVENTION

Multi-touch attribution approaches initially developed within the online digital ad space. In the late-1990's, it was typical for the "last click" on a display or search ad to receive 100% of the "credit" for any visitor who ultimately "converted", which might mean any range of actions from a site visit to a purchase. However, by the mid-2000's, many agencies and ad technology vendors recognized that other marketing events in a consumer's exposure path should also potentially receive credit for contributing toward online conversions. Initially, these models were "rule-based", where position or order in a sequence, such as first click or last click, received some fixed proportion of a conversion credit. However, these rule-based models did a poor job of separating correlation from causality. They also required a domain expert to decide how to assign fractional credit within paths, didn't properly credit tactics that disproportionately appear in conversion paths, and didn't properly account for cross channel interactions and the value of prospecting versus converting media. For all these reasons, by 2012, the industry has largely recognized the need to apply "statistically-driven" attribution models, ranging from Bayesian Hierarchical Shrinkage (employed by Adometry) to linear discriminant analysis (employed by Visual IQ) to bagged logistic regression (employed by Turn).

However, the attribution modeling approaches employed by most vendors today do not differentiate between time and order in attribution paths. While traditional time-series autoregressive models are sometimes also applied, they do not account for the fact that some exposure paths continue to be in progress (i.e., right-censored) at present when a model is run on a weekly, bi-weekly, or monthly basis. Survival analysis (also known by other names including time-to-event models, event history analysis, and duration analysis) accounts for the right-censoring of the data, while properly preparing the data can account for left-truncation (i.e., identifying when a path begins). This invention discloses a specific application of parametric accelerated failure time (AFT) survival models to the attribution fractional credit assignment problem to media channels and the subsequent portfolio optimizations based on those fractional credit assignments in conjunction with media costs.

DETAILED DESCRIPTION OF THE INVENTION

While the following detailed description contains many specifics for the purposes of illustration, anyone of ordinary skill in the art will recognize that many variations and alterations to the following details are within the scope of the invention. As such, the following implementation of the invention is set forth without loss of generality to, and without imposing limitations upon, the claimed invention.

Figure 1:
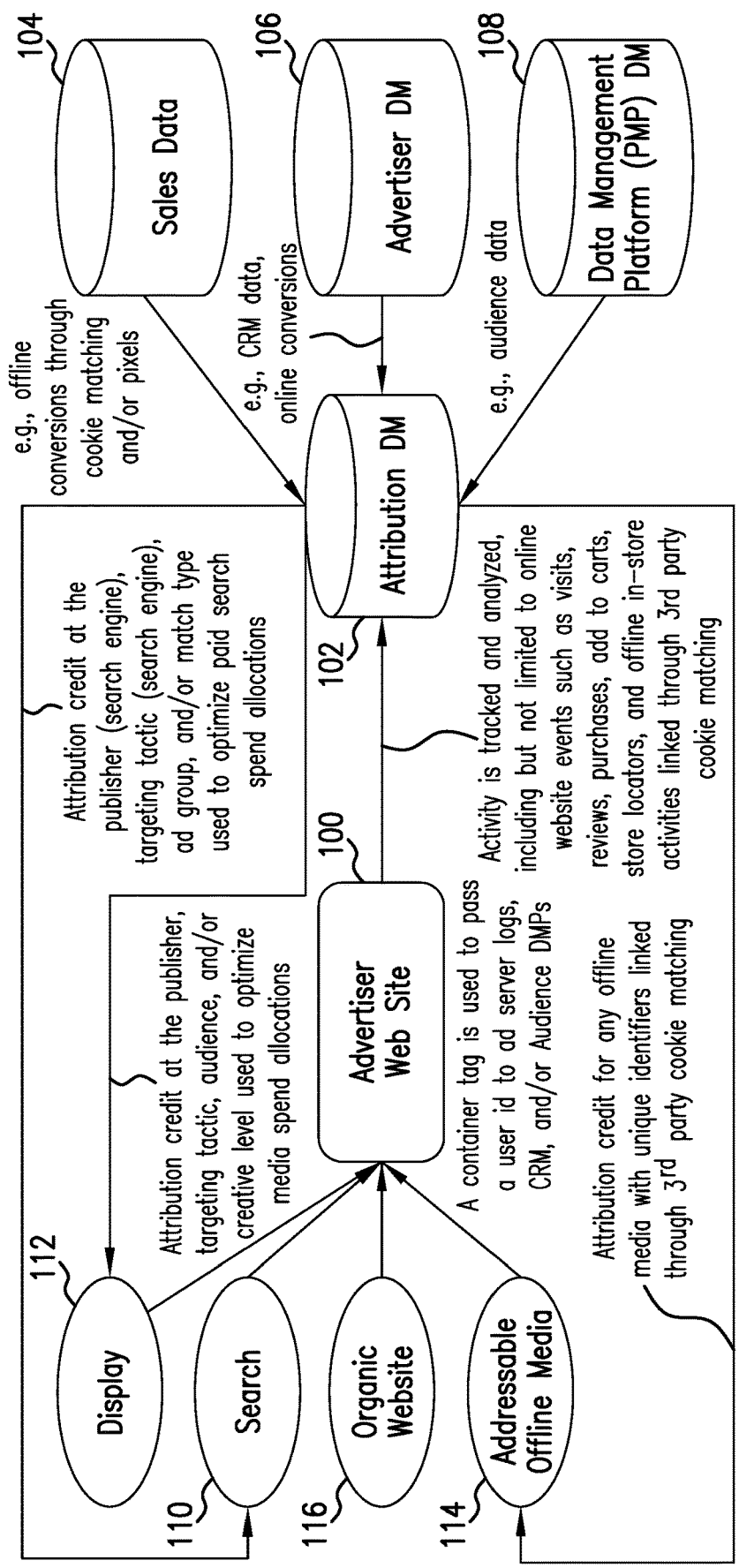
FIG. 1 is a diagram of the relationship among data sources used to deploy the invention. Some embodiments of the invention will include different combinations of data sources, for example, in addition to some or all of display, search, organic web site visits, and addressable offline media, they may include paid social, email, content delivery, or other sources.
Figure 2A:
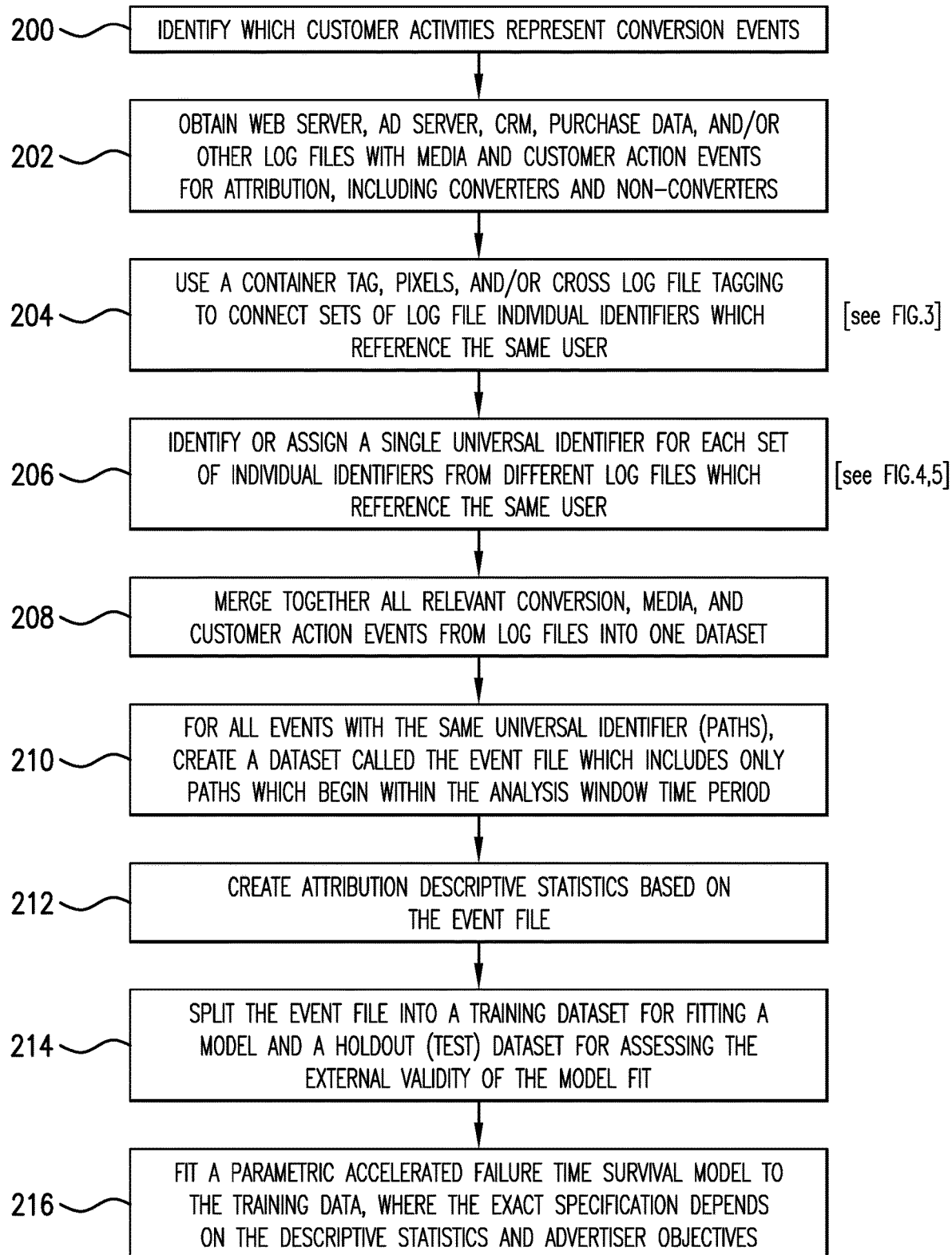
FIG. 2A is a process flow of one embodiment of the invention.
Figure 2B:
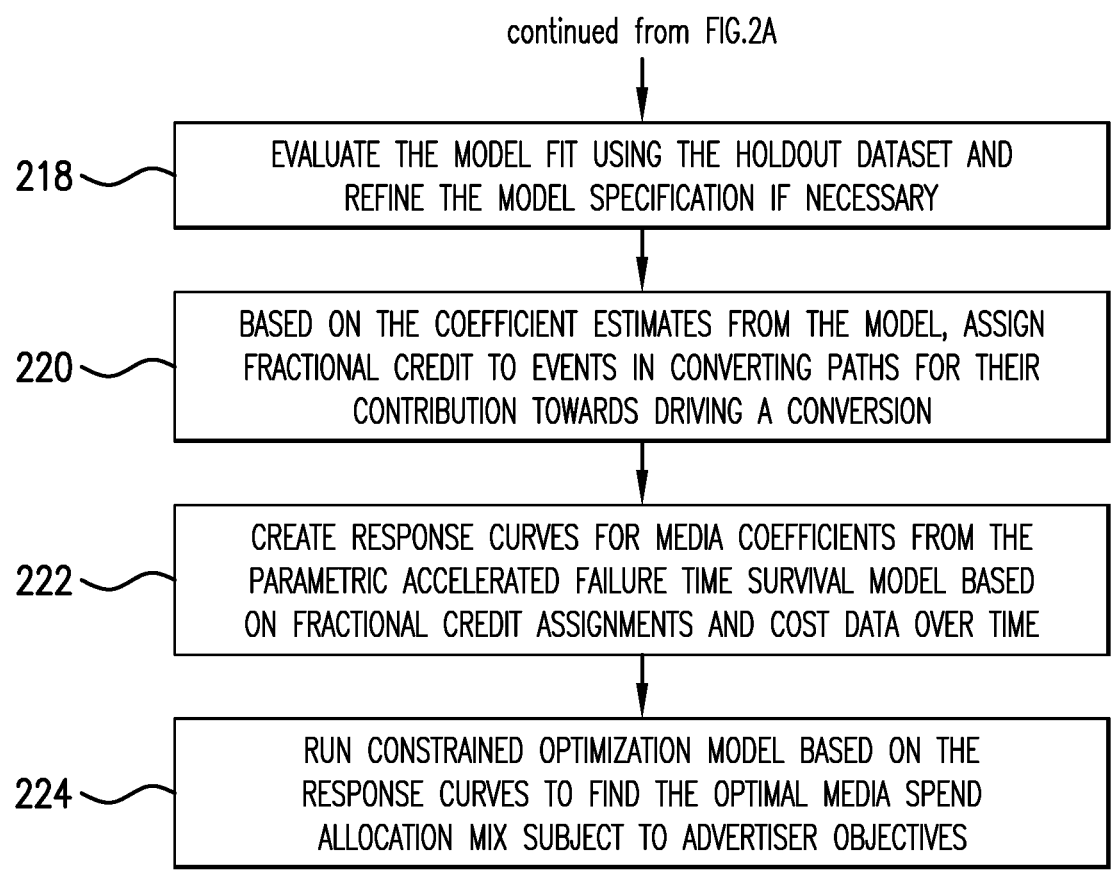
FIG. 2B is a continuation of FIG. 2A.

FIG. 1 illustrates a data infrastructure to categorize, bind, and automate data, reporting, modeling, and optimizations. Regarding the link from an advertiser website (100) to an attribution data mart (DM) (102), activity is tracked and analyzed, including but not limited to online website events such as visits, reviews, purchases, add to carts, store locators, and offline in-store activities linked through third party cookie matching. The attribution DM may comprise sales (104), advertiser DM (106), and data management platform (DMP) DM (108) data. Attribution credit at the publisher (search engine), targeting tactic (search engine), ad group, and/or match type may be used to optimize paid search (110) spend allocations. Attribution credit at the publisher, targeting tactic, audience, and/or creative level, etc. may be used to optimize media spend allocations (display 112). A container tag is used to pass a user id to ad server logs, customer relationship management (CRM), and/or audience DMPs. Attribution credit may be assigned for any offline media (e.g., addressable offline media 114) with unique identifiers linked through third party cookie matching.

One exemplary embodiment is a computer-implemented method for multi-touch attribution where credit for a customer conversion event is fractionally allocated to past media events and customer actions in a multichannel advertising environment. The method includes executing program instructions by at least one processor, causing the processor to fit a survival analysis model based on a parametric accelerated failure time (AFT) specification, to estimate media channel contributions towards the conversion event(s).

A conversion event is defined as an outcome desired by the advertiser, including but not limited to a product purchase, adding an item to an online cart, using a store locator, submitting an inquiry for more information, or taking an action.

Media exposure events belong to either a paid media channel, including but not limited to online digital display advertising, online paid search (SEM), paid social, addressable television, content delivery (e.g., email), as well as unpaid media channels such as organic (natural) search (SEO), direct to website (i.e., organic website).

An AFT parametric survival model is any likelihood function of the form:

$$\mathcal{L} = \prod_{i=1}^{n} [f_i(t_i)]^{\delta_i} [S_i(t_i)]^{1-\delta_i}$$

with the probability density function, $f_i(t_i)$, and survivor function, $S_i(t_i)$, and $\delta_i$ is a dummy variable coded 1 if the event sequence for a universal identifier is uncensored, 0 if censored; and n is the number of universal identifiers in the Event File, and where the functional form has an AFT parameterization. $f_i$ and $S_i$ are subscripted since each individual has a different function for each that depends on the covariates. Time of first event, i.e., when a path begins, is known by applying an "exclusion window" before the analysis time period so as to identify which universal identifiers are actually new path sequences beginning within the analysis time period.

In addition, the above-described embodiment could include fitting a parametric AFT survival model, using Maximum-Likelihood Estimation (MLE), and specifying a particular shape for the hazard rate, i.e., the time dependency.

In the embodiment, an Exponential, Weibull, Log-Logistic, Generalized Gamma, or other parametric AFT distributional form may be selected and applied based on both a quality score for the model fit (e.g., smallest Akaike Information Criterion, AIC) as well as applying domain expertise regarding what functional forms are reasonable for the media domain.

In addition, the above-described embodiments could include operationalizing the media channel covariates in the model to be at the greatest level of granularity (specificity) supported by the data and for which a media team can purchase media either directly in the marketplace and/or programmatically.

In this embodiment, the online digital display media channel level of granularity may include, but is not limited to, publisher, targeting tactic, audience segment, and/or creative designation, where the publisher is the owner of the location where the advertisement is placed, targeting tactics may include but are not limited to geographic, behavioral, contextual, conquesting, device, high impact, prospecting, run of site, site retargeting, search retargeting, etc., audience segments are specific demographic and household information related to purchase behaviors, and creative designation refers to the ad copy.

Further, the paid search media channel granularity may include, but is not limited to, publisher (search engine), targeting tactic (search genre, e.g., brand, research, promotions, conquesting, etc.), ad group, and/or match type (i.e., exact, broad, etc.).

In addition, all other media channels are at the greatest level of granularity supported by the data and which a media team can action against.

In addition, the above-described embodiments could further include calculating changes to predicted probabilities for all media and customer action events which precede conversion events, based on the parametric AFT survival model coefficient estimates, and allocating credit for each conversion proportional to all other changes in predicted probabilities preceding a conversion event.

A further embodiment could include fitting response curves (also known as yield curves) to each media channel by calculating total conversion credit for each media channel, at a level of granularity which includes, but is not limited to, publisher and targeting tactic, for a period of time matched to total actualized media cost for that period.

This embodiment would also include creating the parametric AFT survival model based response curves by fitting a negative exponential:

$$y = a*(1 - e^{-bx}), \lim_{x \to \infty} y = a$$

or a sigmoidal functional form (s-curve), e.g.:

$$y = \frac{a*x^b}{c+x^b}; c > 0, b > 0, \lim_{x \to \infty} y = a$$

with said processor(s), calculating confidence intervals, e.g., 95%, around the response curves in order to provide confidence levels to the recommended media allocations from the model.

A further embodiment could include, with processors, applying a constrained optimization for a set of media channels in a model specification to find the optimal allocation to maximize the number of conversions for a given budget:

$$\max f(x) = \sum_{i \in S} x_i$$

where i=publisher-tactic, S=set of all publisher-tactics in media plan, $x_i$=projected # of converters for i, and $c_i$=spend for period of time for i subject to:

$$x_i = a_i \times [1 - e^{(-b_i \times c_i)}] \text{ for } \forall\, i \in S$$

$$\sum c_i \leq \text{Budget Constraint}$$

where this optimization can also be reformulated to use an s-curve as a constraint instead of the negative exponential, or the problem can be reformulated to find the minimum budget and corresponding media spend allocations necessary to achieve a given targeted number of total conversions.

The embodiments may also include confirming external validity of the model against both a holdout test sample from the same time period as when the model is created as well as re-running the model later on after more time has elapsed to verify consistency over time, as models are typically fit to a dataset for a time period up to the present since understanding media effectiveness is time sensitive.

The embodiments may also further include: with respect to executing a parametric accelerated failure time survival model for multitouch attribution in advertising, obtaining and merging media, customer action, and/or conversion event log file datasets at the individual identifier level;

fitting a parametric accelerated failure time (AFT) survival model to the data; and calculating and allocating credit for conversion events based on model outputs.

The embodiments may also include:

identifying which customer activities represent conversion events;

obtaining web server, ad server, CRM, purchase data, and/or other media log files with relevant events for multitouch attribution, including converters and non-converters;

implementing a container tag, pixels, and/or cross log file tagging to connect sets of log file individual identifiers which reference the same user;

identifying and assigning universal identifiers for each set of individual identifiers which reference the same user;

merging together all relevant events from log files into one dataset;

creating a dataset called the Event File which includes only paths (i.e., all events with the same universal identifier) which begin within the analysis window time period;

creating attribution descriptive statistics based on the Event File;

splitting the Event File into a training dataset for fitting a model and a holdout (test) dataset for assessing the external validity of the model fit;

fitting a parametric accelerated failure time (AFT) survival model to the training dataset, where the exact specification depends on the descriptive statistics and advertiser objectives;

evaluating the model fit using the holdout dataset and refining the model specification if necessary, e.g., based on comparing the expected value of the mean squared error (MSE) for the training dataset versus the holdout dataset subject to an acceptable tolerance to avoid overfitting the model;

assigning fractional conversion credit to events in converting paths for their contribution towards driving a conversion event based on coefficient estimates from the model;

creating response curves for media coefficients from the parametric AFT survival model based on fractional credit assignments and media channel cost data over time; and fitting a constrained optimization model based on the response curves to find the optimal media spend allocation mix subject to advertiser objectives.

Consistent with the present invention, there are other ways this method can be adapted or altered for various purposes. Referring to FIGS. 2A, 2B, 3, 4, 5:

Initial Requirements: The first step 200 for running attribution is identifying which customer activities represent conversion events (e.g., online or offline purchase, visit a store locator web page, add an item to a cart, request a quote, etc.). Once conversion event(s) are identified, then we obtain all relevant and available data sources which could be useful for understanding conversion behavior. These usually include web server, ad server, CRM, purchase data, and/or other media log files, which must be merged together into one data set. (step 202). Depending on what data sources and conversion types are included, this is possible using cross log file tagging, implementing a container tag, and/or working with $3^{rd}$ party user id matching partners. (step 204). Attribution requires time-stamped events and unique path identifiers, where a path represents all individual-level tracked media exposures, site activities, and/or any other relevant log file event for creating a predictive model for conversion.

Figure 3:
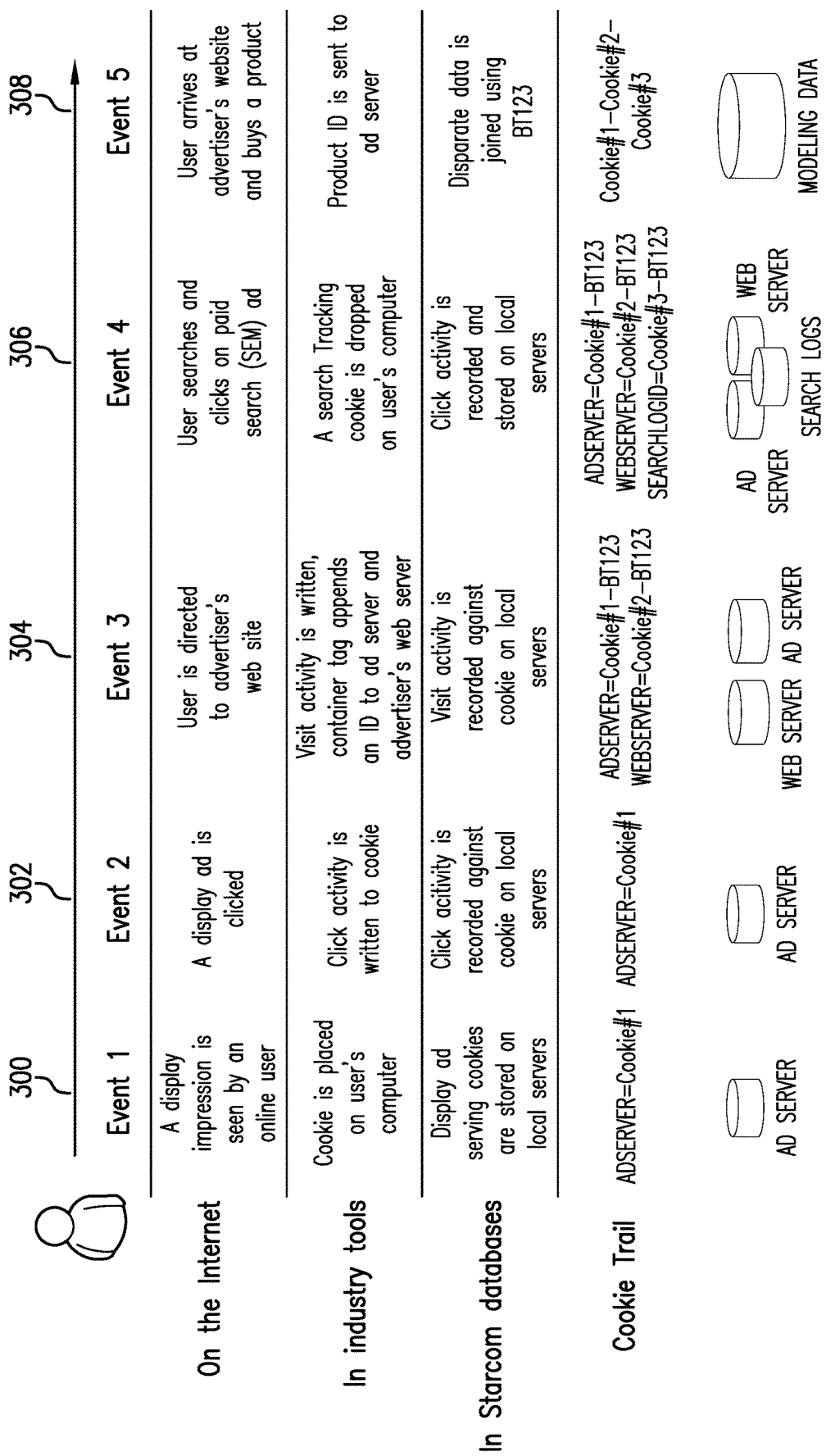
FIG. 3 is an illustration of an attribution path's construction for a new media exposed website visitor with an online conversion event.

FIG. 3 is an illustrative example of how an attribution path is constructed for a new media exposed website visitor using cross log file tagging in conjunction with a container tag. In this example, a display impression is seen by an online user. A cookie is placed on the user's computer, and display ad serving cookies are stored on local servers (300). Next in this example, the user clicks a display ad. The click activity is written to the cookie file. The click event is recorded for that cookie on local servers (302). The click event directs the user to the advertiser's web site. When the visit activity is written to the log files, the container tag appends a container tag identifier in both the ad server and web server log files. The visit activity is then written for that cookie on local servers (304). Later on, the user may conduct a search and click on a paid search ad. A search tracking cookie is set on the user's computer. When the visit activity is written to the log files, the container tag appends a container tag identifier to the search log files. That click activity is recorded and stored on local servers (306). Last, this user now revisits the advertiser's web site and takes an action defined as a conversion event, for example, buying a product. The product ID is sent to the ad server. It is now possible to link identifiers across all log files to that conversion event (308).

Figure 4:
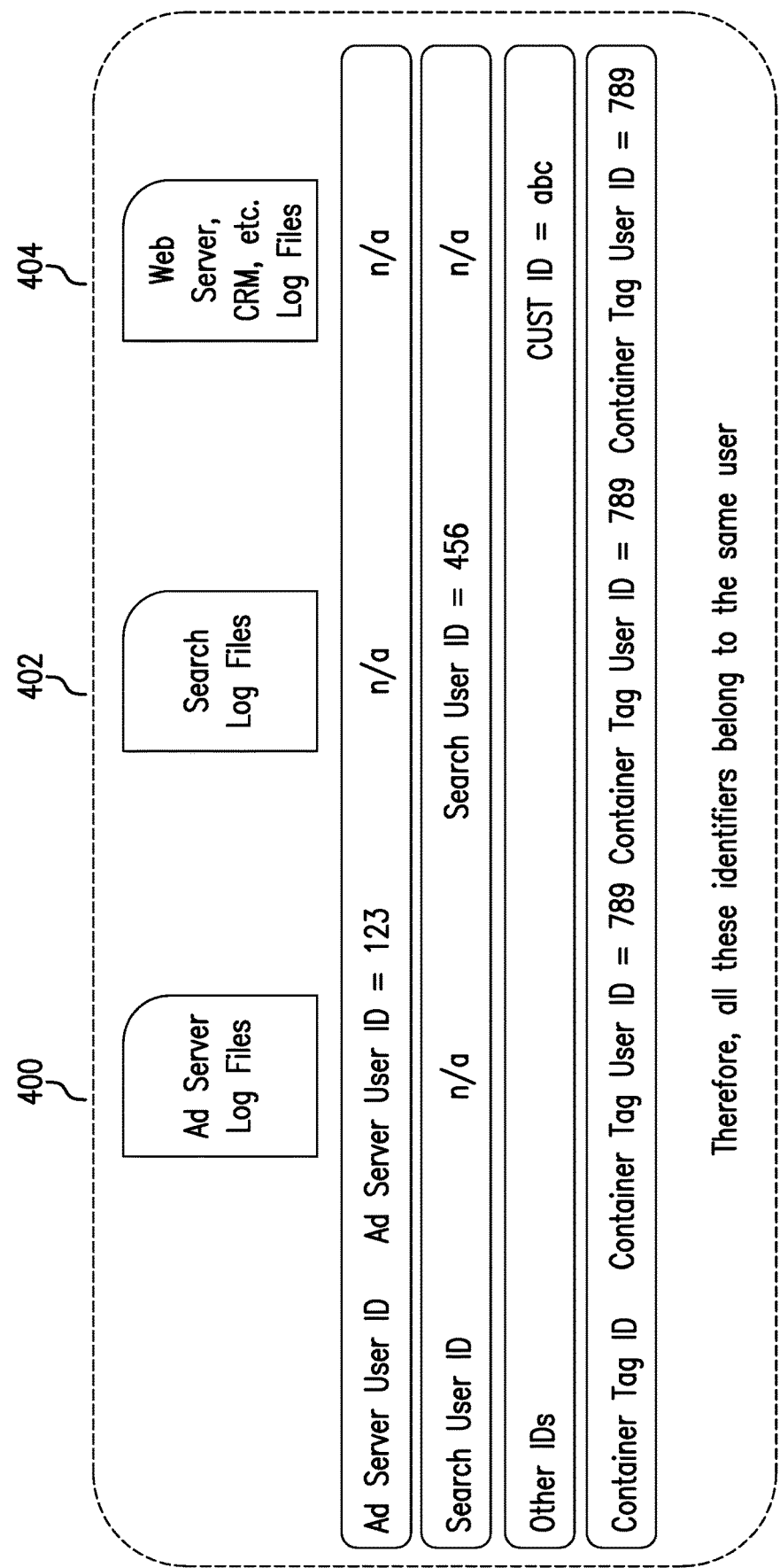
FIG. 4. is an illustration of how identifiers from a container tag and/or pixels can be used to connect together log files with different unique identifiers from different platforms. A container tag is a website tag capable of triggering multiple tags from other systems. In some circumstances, cross log file tagging—where identifiers from log files for one media channel are passed into log files for a different media channel—can also often be used to achieve the same result.

FIG. 4 provides a second illustrative example of how identifiers from a container tag and/or pixels can be used to connect together log files with different unique identifiers from different platforms. In this example, the container tag is the common identifier which makes it possible to know which identifiers across different systems, e.g., ad server log files (400), search log files (402), web server, CRM, etc. log files (404) belong to the same user.

In some cases, there can be a many-to-many relationship among identifiers used in different log files, so all identifiers where a connection exists directly or through chains of other identifiers should be grouped together and assigned a single universal identifier for every unique path, step 206. This can be calculated efficiently using depth first search, as well as with other graph algorithms, where the identifier with the lowest value is used to represent all identifiers in the same connected component.

Figure 5:
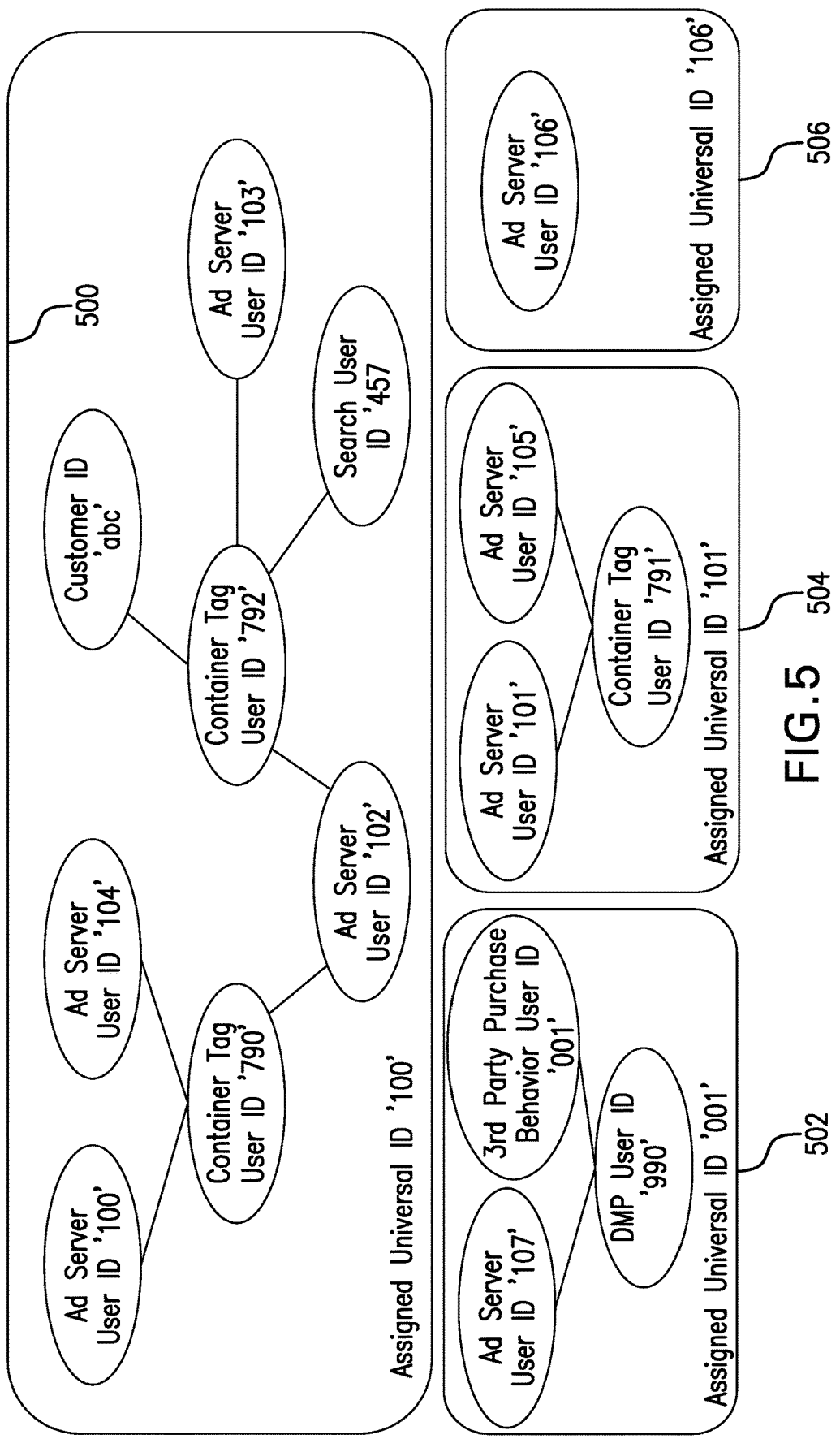
FIG. 5. is an illustration of a method of identifying and assigning a single universal identifier to sets of individual identifiers from different log files.

FIG. 5 provides examples for how groups of identifiers from different systems which share common connections directly or through chains of other identifiers are grouped together and assigned a single universal path identifier for the group. These sets of identifiers which share common connections among them are called 'connected components' in graph theory. For example, multiple ad server identifiers may be connected to one or more container tags, which may be connected to search identifiers or an identifier from a CRM system (500). An ad server identifier could also be connected to a DMP user id which is used to connect to an offline conversion event through syncing to a $3^{rd}$ party user id (502). A common case are multiple ad server identifiers connected to the same container tag user identifier (504), or isolated ad server user ids which have no connections (506).

Referring back to FIG. 2A, once universal identifiers are assigned to all events from all data sources for attribution, the next step 208 is to merge together the multiple log file sources so that each row is an event with a corresponding timestamp, individual identifier, with other fields containing more information about the event or the identifier. In addition to the need to link together multiple platforms, it also often requires resolving multiple formats into one data set. For example, a digital advertiser might use one partner for display ad serving and overall event tracking, another partner for tracking paid search/paid social/content delivery, and a different ad server for dynamic creative campaigns. The dataset for such a combination is created by appending event records from all these log files using a combination of container tags and user ids native to each log file provider.

An initial model is based on log files from a period of time of sufficient length to determine a parsimonious parameterization where the granularity of variables (e.g., campaign name/type, digital publisher, targeting tactic, audience, creative) are as specific as possible but as general as necessary for media teams to optimize against. Attribution requires knowing when a new path begins, therefore, the first portion of a sample time period, the "exclusion window", which is usually 90 days, is used to determine who is new as of the second portion, the "analysis window". The exclusion window length, in this case 90 days, is based on the distribution of the length of time between events. It might be shorter or might be longer for any given advertiser. Therefore, the sample represents all user paths who either were first exposed to an advertiser's media or first visited the advertiser's website during the analysis window of the time period. (step 210).

The Event File is transformed into a final dataset for running a survival analysis based on descriptive statistics for the dataset, including variable frequencies and distributions. (step 212). For example, the publisher is based on the placement ID, and the targeting tactic is determined based on a taxonomy applied to placement names. Two letter codes are used to identify publishers, and three letter codes are used to identify targeting tactics.

Attribution requires a large amount of data. As shown at step 214, the event file is split into a training dataset and a holdout dataset. The zipped raw digital log files can often be larger than a hundred gigabytes per month. A training data set (which is unzipped) is usually a few hundred gigabytes for all unique identifiers in a time period; however, this reduces down to around one fifth the size when only considering new paths during the analysis window. A small portion of the paths from the training dataset are held out as a test—or validation—dataset for later testing external validity of the model.

The variables in both the training and validation event files are the same: a universal identifier (based on ids from different log file providers which are associated together); timestamp; conversion event flag; event type (including but not limited to, display view, display click, paid search—branded keyword ad groups, paid search—unbranded keyword ad groups, new customer purchase, existing customer purchase, add to cart, store locator, SEO (i.e., natural search), direct-to-site (i.e., organic website visits), other non-paid media events, etc.); publisher, and targeting tactic, audience segment, and creative designation (if applicable). Note also, it is essential to include non-paid media events as well, such as direct-to-site, as some conversions would happen even with no paid media support. Fractional conversion credit must be allocated to such channels for marketing ROI calculations to be accurate for paid channels.

Model Details: The objective of the model is to understand the holistic impact of all paid and unpaid media—both display, SEM (paid search), SEO (natural search), direct-to-site (organic website), and offline channels with individual identifiers)—on driving to conversion (either a single or multiple conversions are possible). This helps provide additional context on the ultimate value of brand and acquisition campaigns and specific publishers and targeting tactics.

The level of granularity for display is at some combination of the publisher, targeting tactic, audience, creative level, and for paid search, the publisher (search engine), targeting tactic (search genre), ad group, and/or match type. It is best to use the greatest level of granularity which a media team can buy against and which is supported by the data. This is usually the publisher-tactic level for display (and therefore publisher-tactic will be used to refer to display granularity going forward), and some combination of ad group/match type/keyword clusters (i.e., the search genre).

For example, if the dependent variable were first online purchase, these events could be identified either from website log files or floodlight tags in ad server activity files.

Descriptive statistics are used to help determine which variables should be included in the model. For example, publisher-tactic impression counts and frequencies, publisher-tactic display impressions served per unique identifier, and the correlation matrix among publisher-tactics in a model.

In general, even for very large advertisers with sophisticated campaigns, 75 display publisher-tactic combinations account for >99% of impressions served in a given month, in most circumstances. As many of these are included in the automated model as possible, but not always all, as there are a couple challenges for including all in the model development process: (1) the sample sizes for some are too small to make reliable estimates given the very small conversion rates and (2) combinations need to be further broken apart into number of exposures in a path, which can dramatically increase the number of variables in the model beyond a practical limit.

We use the parametric accelerated failure time (AFT) survival specification since media data usually does not meet the proportional hazards (PH) assumption required by semi-parametric (e.g., Cox) and parametric PH survival model specifications. While we select whatever underlying distribution best fits the data for a specific advertiser, Weibull, Log-Logistic, and Generalized Gamma distributions are the most commonly employed and are fit using Maximum-Likelihood Estimation (MLE). The Log-Logistic distribution is often especially well-suited to media data as it balances computational feasibility, a flexible functional form for ongoing automation where the effect of time might change, and is among specifications which well fit the data. (step 216).

Below is one embodiment of the invention using the Log-Logistic distribution, where the general likelihood function for the Log-Logistic AFT survival model to maximize is:

$$\mathcal{L} = \prod_{i=1}^{n} [f_i(t_i)]^{\delta_i} [S_i(t_i)]^{1-\delta_i} \quad (1)$$

Where the Log-Logistic AFT survivor function is:

$$S_i(t_i) = [1+(\lambda_i t_i)^{1/\gamma}]^{-1} \quad (2)$$

The probability density function (p.d.f.) is:

$$f_i(t_i) = \frac{\lambda_i^{(1/\gamma)} t_i^{[(1/\gamma)-1]}}{\gamma[1+(\lambda_i t_i)^{(1/\gamma)}]^2} \quad (3)$$

And finally, the Log-Logistic AFT parameterization is:

$$\lambda_i = e^{(-x_i \beta)} \quad (4)$$

$x_i$ is a vector of covariates; $\delta_i$ is a dummy variable coded 1 if uncensored, 0 if censored; $\gamma$ is an ancillary parameter for the Log-Logistic distribution; and n is the number of universal identifiers in the Event File. Note also that $f_i$ and $S_i$ are subscripted since each individual has a different function for each that depends on the covariates.

The final list of covariates used as inputs to the model are selected based on what is available and what media teams are able to action against. This is usually the publisher-tactic level, and all combinations that have at least one converter are tested for inclusion in the model. To account for saturation and adjust for outliers, exposures are polytomously coded into groups, for example 1, 2-10, and 11+, for each path and then the credit for each display coefficient is divided across similar impressions within the same path. These cutoffs are based on the distributions for the publisher-tactic combinations for display impressions served per unique identifier.

Coefficients from an AFT model are interpreted as follows: a one unit increase in $x_i$ leads to a $\beta_i$ increase in the logged survival time. Alternatively, one can exponentiate the coefficient to find the time ratio. For example, if an exponentiated coefficient is 1.1, a one unit increase in $x_i$ increases the survival time by a factor of 1.1, meaning that the survival time is 1.1 times longer. If the exponentiated coefficient is less than one, then the survival time is shorter by that factor amount. Ultimately, the coefficients are used to calculate changes in probabilities of conversion based on exposure to the different touchpoints, which in turn are used to calculate attribution fractional credit for each touchpoint.

Other model specifications were considered, including traditional logistic regression, non-parametric survival models, and proportional hazard survival models (semi-parametric and parametric). Logistic regression and non-parametric survival models can be ruled out due to poor fit, while the PH survival models consistently fail a global test of scaled Schoenfeld residuals, so are also not appropriate for media data. Within the AFT models, a Weibull distribution often fits equally well as the Log-Logistic (as the Weibull had a very low rho and the Log-Logistic a high gamma value); however, the Log-Logistic is usually used due to greater flexibility in the function form. This is important for an automated model where the shape of the distribution might change with time. The Weibull distribution forces a monotonic shape on the hazard function whereas the Log-Logistic does not, and is hence more flexible to changing conditions. A Log-Normal was excluded due to the wrong functional form for the hazard (poor fit) and a Generalized Gamma is usually excluded due to practicality, as the computational complexity estimating hundreds of variables across millions of cases produced noticeably worse estimation performance.

Model Validation and Performance Tracking: The external validity of the model is tested by applying the coefficients from the training data set to a holdout test dataset. If the fit is outside the tolerance agreed to in advance with an advertiser, we typically add more (or more granular) publisher-tactic(-audience-creative) pairs, (b) breaking out branded and unbranded paid search into more ad group and match types, or something similar, (c) run the model against a longer time horizon, (d) add more control variables to the model, and/or (e) check for and include significant display view before paid search interactions, as we know from experience these can be especially important for fully capturing the impact of display brand campaigns.

Tracking the predicted vs. actual conversions every time the model is run versus past periods also helps us monitor model fitness on an ongoing basis. New paths are scored every time the model is run. As shown at step 218, the model is re-specified if it loses predictive power, defined here as predicted vs. actual conversions for a holdout (or other out-of-sample) period falling outside initially agreed upon tolerances.

Model Deployment: The attribution model is responsible for estimating the fractional contribution credit of each trackable event preceding a conversion event in the consumer journey. As shown at step 220, fractional credit for each event in a path is determined by calculating the change in the predicted probability of conversion for the path relative to an identical path excluding only that specific event. For positive changes in the probabilities, credit assigned to any given touchpoint is relative to the positive predicted probability changes of all other events where credit is distributed proportionately based on the size of the changes. Events associated with non-positive changes in the predicted probability of conversion are assigned zero credit, except in the special case when a path contains only that single media or customer action event prior to the conversion event(s), or in the special case where all media and customer action events in a path have negative impacts on the change in predicted probability of conversion, in which case, the negative inverse of each change in predicted probability of conversion is taken and fractional credit is allocated proportionately. The total cost of each paid media event type (e.g., at the publisher-targeting tactic granularity for display) is divided into the summed fractional credit for each event type to arrive at the primary key performance indicator (KPI), cost per fractional conversion (CPFC). This makes it possible, for example, to compare all publisher-tactics on an equal basis regardless of pricing rate type, e.g., Cost per Acquisition (CPA), Cost per Click (CPC), Cost per Mille (CPM), Flat Rate, etc. However, it does not tell us how well a publisher-tactic may or may not scale at a different spend level. Therefore, typically after 3-4 months of running attribution, we have sufficient data for spend vs. fractional conversions for different spend levels by publisher-tactic, etc. to estimate response curves, as shown at step 222. This may be accomplished by fitting negative exponential or sigmoidal curves through past spend/credit combinations over time. It is often easier to consistently fit negative exponential curves in an automated model to publisher-tactic performance, so negative exponential curves are usually used unless there is a goodness-of-fit issue which requires moving to sigmoidal curves. All of these curves are used together to construct a scenario plan where it is possible to make optimization recommendations. This is done by applying a constrained optimization model to the paid media channel response curves to find the optimal media budget allocation mix to either maximize conversions for a fixed level of advertising spend or to minimize cost for a given projected number of conversions, subject to advertiser objectives. (step 224).

We claim:

1. A computer-implemented method for multi-touch attribution, the method comprising:
    identifying, using one or more processors, customer activities that represent conversion events;
    obtaining, using the one or more processors, attribution log files including individual identifiers, media events, and customer action events;
    associating, using the one or more processors, sets of attribution log file individual identifiers that reference a same user;
    determining, using the one or more processors, an identifier for each set of attribution log file individual identifiers;
    merging, using the one or more processors, conversion event, media event, and customer action events from log files into a single dataset;
    determining, using the one or more processors, an event file dataset for events associated with the same identifier, wherein the step of determining the event file dataset includes
        determining, using the one or more processors, whether a user path is first exposed in an analysis window of a time period,
        a first portion of the time period provides an exclusion window,
        a second portion of the time period provides the analysis window, and
        including the user path in the event file when it is determined that the user path is first exposed in the analysis window;
    splitting, using the one or more processors, the event file dataset into a training dataset for fitting a model and a holdout dataset for assessing the external validity of a model fit;
    developing, using the one or more processors, a parametric accelerated failure time (AFT) survival model to the training dataset, wherein the AFT survival model uses data regarding the individual identifiers, the media events, and the customer action events, the AFT survival model comprises a plurality of control parameters for granularity;
    evaluating, using the one or more processors, the AFT survival model fit using the holdout dataset and refining a model specification based on comparing an expected value of a mean squared error for the training dataset compared to the holdout dataset;
    refining, using the one or more processors, the AFT survival model by adding additional control parameters to the AFT survival model to improve the AFT survival model fit to within acceptable tolerances;
    determining, using the one or more processors, fractional credit to the conversion events based on coefficient estimates from the AFT survival model;
    determining, using the one or more processors, response curves for media coefficients of the parametric AFT survival model based on fractional credit assignments and media channel cost data over time; and
    fitting, using the one or more processors, a constrained model based on the response curves to determine a media spend allocation mix based on advertiser objectives.

2. The method of claim 1, wherein the event file dataset only includes events which begin within the analysis window.

3. The method of claim 2, wherein the associating sets of attribution log file individual identifiers includes using a container tag, pixels, or cross log file tagging.

4. The method of claim 3, wherein the identifying customer activities that represent conversion events includes obtaining web server, ad server, CRM, or purchase data.

5. The method of claim 4, further comprising determining attribution descriptive statistics based on the event file dataset.

6. The method of claim 1, wherein the AFT parametric survival model includes a likelihood function $\mathcal{L}$ of the form $$\mathcal{L} = \prod_{i=1}^{n} [f_i(t_i)]^{\delta_i} [S_i(t_i)]^{1-\delta_i}$$

where $f_i(t_i)$ is a probability density function, $S_i(t_i)$ is a survivor function, and $\delta_i$ is a dummy variable.

7. The method of claim 1, wherein the associating sets of attribution log file individual identifiers uses a container tag, pixels, or cross log file tagging.

8. The method of claim 7, wherein the identifying customer activities that represent conversion events includes obtaining web server, ad server, CRM, or purchase data.

9. The method of claim 7, wherein the identifying customer activities that represent conversion events includes obtaining web server, ad server, CRM, or purchase data.

10. The method of claim 9, further comprising determining attribution descriptive statistics based on the event file dataset.

11. The method of claim 1, wherein the identifying customer activities that represent conversion events includes obtaining web server, ad server, CRM, or purchase data.

12. The method of claim 1, further comprising determining attribution descriptive statistics based on the event file dataset.

* * * * *